F. BRIGGS.
BEET HARVESTER.
APPLICATION FILED SEPT. 23, 1909.
1,046,550.
Patented Dec. 10, 1912.
2 SHEETS—SHEET 1.
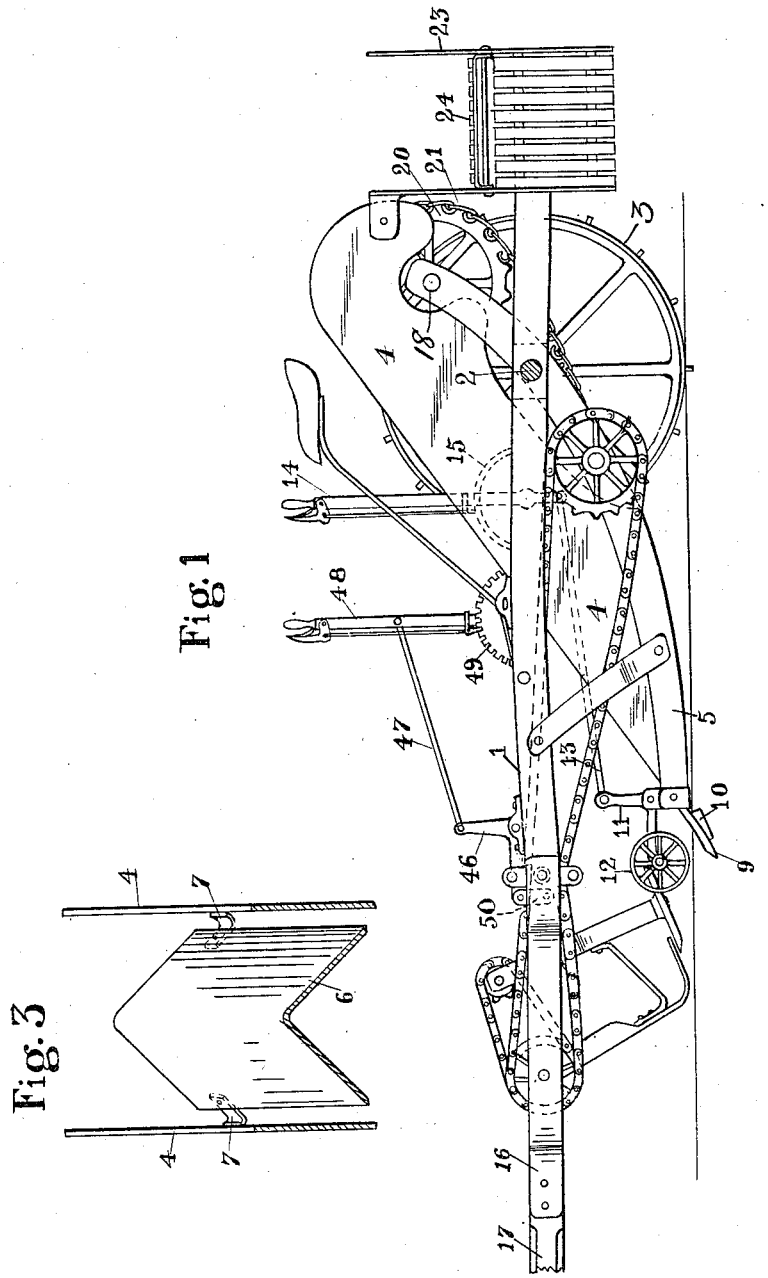
WITNESSES:
C. M. Shannon.
A. M. Dore
INVENTOR
FRANK BRIGGS
BY
ATTORNEYS

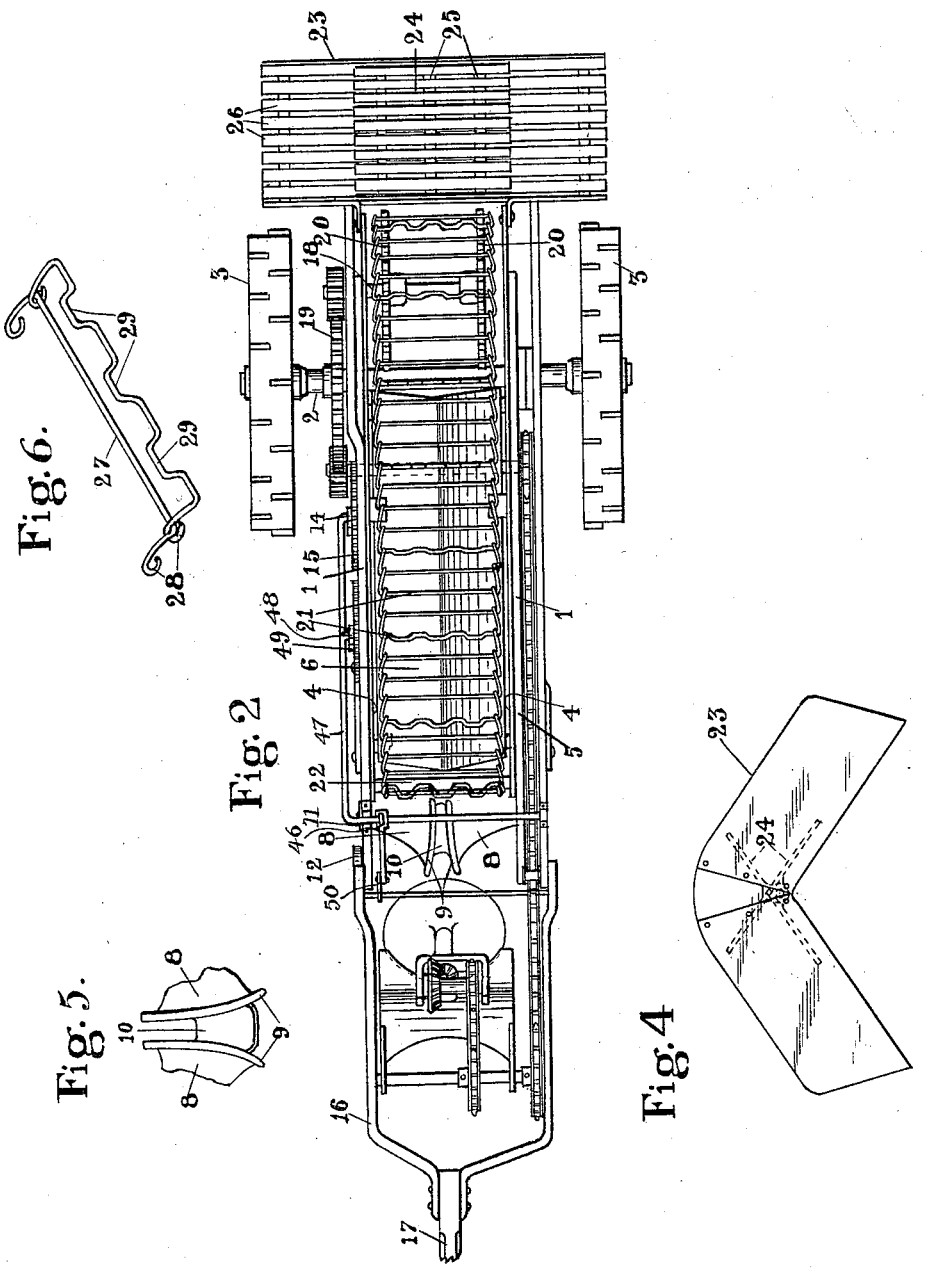

UNITED STATES PATENT OFFICE.

FRANK BRIGGS, OF CARO, MICHIGAN, ASSIGNOR TO BRIGGS BEET HARVESTER COMPANY, OF SPOKANE, WASHINGTON, A CORPORATION OF WASHINGTON.

BEET-HARVESTER.

1,046,550.   Specification of Letters Patent.   Patented Dec. 10, 1912.

Application filed September 23, 1909. Serial No. 519,181.

*To all whom it may concern:*

Be it known that I, FRANK BRIGGS, a citizen of the United States of America, residing at Caro, in the county of Tuscola and State of Michigan, have invented certain new and useful Improvements in Beet-Harvesters, of which the following is a specification, reference being had therein to the accompanying drawings.

This invention relates to beet harvesters of the class wherein the beets are both topped and lifted in substantially one operation, and to a certain arrangement of the mechanism which increases the capacity of the machine, and also to a disposition of the parts whereby the beets are delivered in marketable condition.

The invention consists in the matters hereinafter set forth and more particularly pointed out in the appended claims.

In the drawings, Figure 1 is a view in side elevation with a traction wheel removed, of a beet harvester embodying features of the invention; Fig. 2 is a plan view of the machine with parts removed; Fig. 3 is a view in detail of a portion of a conveyer chute, of preferred form; Fig. 4 is a view of an adjustable delivery end of the chute; Fig. 5 is a view in detail of a pair of beet lifting members and a connecting yoke therefor; and Fig. 6 is a view in detail of a preferred form of a conveyer chain.

Referring to the drawings a frame 1 of suitable design is journaled on a drive axle 2 of a pair of traction bearing wheels 3 which have any suitable compensating connection therewith such as is common in agricultural machinery and is not indicated in detail herein. An inclined conveyer chute is mounted on this frame with its upper rear delivery end above and behind the axle 2. In its preferred form the chute consists of parallel side members 4 whose lower ends are connected to side rods 5 on the machine, and a bottom plate 6 longitudinally crowned throughout its length or of inverted V-shape in cross section that is secured to the side members 4 by suitable means, as brackets 7, with its margins each separated from the adjacent side by a suitable interval. A pair of shoe plates 8 which are slightly inclined forward, act as supports for a pair of divergent lifting bars 9 which are connected by a depending U-shaped yoke 10, the forward ends of the lifters being adapted to penetrate the earth and embrace a beet. A pair of rock arms 11 are pivoted to the forward end of the beams 5 and have gage wheels 12 journaled on their forward ends, a link connection 13 with a hand lever 14 interlocking with a quadrant 15, enabling the operator to raise or lower the gage wheels and thereby gage the depth to which the lifters penetrate the earth. A forward extension 16 of the frame is pivotally connected to the forward end of the members 1 and may be angularly adjusted in relation thereto by a lever and quadrant 48, 49 coupled by a link 47 to a bell crank 46 one arm of which is connected by a bar 50 to the inner end of the extension. A pole 17 extends forward for draft purposes.

A counter shaft 18 journaled across the rear end of the conveyer chute, is driven from the main axle by a gear train 19 or other suitable connection. Sprocket wheels 20 keyed or otherwise secured to the countershaft, drive an endless conveyer chain 21 around idler sprockets 22 journaled in the lower end of the chute near the lifters 9, the chain being adapted to carry material from the lifters to the upper end of the chute. The latter may discharge if preferred, into a side delivery trough 23. The latter in its preferred form is transversely disposed across the rear ends of the members 1 with oppositely inclined arms. A gate 24 is pivotally secured at the crest of the trough 23 so as to be tilted into the plane of the bed of either arm, thus causing beets or other matter delivered by the chain to fall either to one side or the other. Preferably the gate is formed of parallel spaced rods 25 while an open grill work 26 forms the bottom of the arms of the delivery trough 23, thus allowing dirt and debris to fall through.

The conveyer chain may be of any desired construction, but in its preferred form consists of a series of links each made of a bar 27 with its end portions turned transversely back and inward and formed into eyelets 28 adapted to hook around the adjacent link bar. Certain of the link bars are bent to form carrier lugs 29 which lie in a plane transverse to the plane of the link arms.

Any preferred form of beet topping mechanism is secured to the main frame in advance of the lifters in order to clear their path.

In operation the topper removes the tops and sweeps them out of the way of the lifters. The latter, whose position is gaged by the operator through the medium of the gage wheels, underrun the beet, which is lifted up and deposited thereby on the conveyer chain that carries it to the delivery trough, the greater part of the dirt which adheres to the beet or is lifted with it, being shanken off and falling away from the chain so that the beets roll out from the machine on to the beet tops or the surface of the ground, thoroughly cleaned by the tumbling action of the chain and consequently ready for the market, the dirt not being carried to the delivery end of the conveyer, and therefore not covering the delivered beets.

One feature of the machine is the rigidity of construction due to the use of the yoke connecting the beet lifters and the small number of operating members so that the machine is light in draft and readily operated in all soils.

Obviously, detail of construction may be varied without departing from the spirit of the invention, and I do not limit myself to any particular form or arrangement of parts.

Having thus fully described my invention what I claim is:

1. In a beet harvester, a pair of traction wheels, a main frame supported at its rear end on the traction wheels, an extension frame pivotally supported on the forward end of the main frame, means for angularly adjusting the extension frame in relation to the main frame, a pair of forwardly extending side bars whose lower portions lie beneath the main frame and are rigidly secured thereto and whose upper ends lie above and to the rearward of the traction wheels, gage wheels on which the forward ends of the bars are adjustably supported, a conveyer chute whose forward end is secured to the lower ends of the members and whose upper end terminates back of the traction wheels, a conveyer flight sweeping the chute, a conveyer flight driving wheel journaled on the upper ends of the side bars, beet lifters rigidly secured to the lower ends of the chute and side bars, and driving mechanism operatively connecting the conveyer flight and traction wheels.

2. In a beet harvester, a pair of traction wheels, a main frame supported at its rear end on the traction wheels, an extension frame pivotally supported on the forward end of the main frame, means for angularly adjusting the extension frame in relation to the main frame, a pair of forwardly extending side bars whose lower portions lie beneath the main frame and are rigidly secured thereto and whose upper ends lie adjacent to the traction wheels, gage wheels on which the forward ends of the bars are adjustably supported, a conveyer chute whose forward end is second to the lower ends of the members and whose upper end terminates adjacent the traction wheels, a conveyer flight sweeping the chute, a conveyer flight driving wheel journaled on the upper ends of the side bars, beet lifters rigidly secured to the lower ends of the chute and side bars, and driving mechanism operatively connecting the conveyer flight and traction wheels.

In testimony whereof I affix my signature in presence of two witnesses.

FRANK BRIGGS.

Witnesses:
D. HEALY CLARK,
FREDK. T. WHEAT.

Copies of this patent may be obtained for five cents each, by addressing the "Commissioner of Patents, Washington, D. C."